(12) United States Patent
Sweitzer et al.

(10) Patent No.: US 7,020,189 B2
(45) Date of Patent: Mar. 28, 2006

(54) METHOD AND APPARATUS FOR IMPLEMENTING DIGITAL FILTERS IN THE DATA PATH OF A PCM MODEM FOR EFFICIENT TRANSITION OF A SECOND ANALOG-TO-DIGITAL CONVERSION PROCESS

(75) Inventors: Steven R. Sweitzer, Hillsborough, CA (US); James Hon, Pleasanton, CA (US); Kerry Schutz, Fremont, CA (US)

(73) Assignee: GoDigital Networks Corporation, Fremont, CA (US)

( * ) Notice: Subject to any disclaimer, the term of this patent is extended or adjusted under 35 U.S.C. 154(b) by 855 days.

(21) Appl. No.: 09/922,508

(22) Filed: Aug. 3, 2001

(65) Prior Publication Data

US 2002/0072879 A1  Jun. 13, 2002

Related U.S. Application Data

(63) Continuation-in-part of application No. 09/527,783, filed on Mar. 17, 2000, now abandoned, which is a continuation-in-part of application No. 09/510,420, filed on Feb. 22, 2000, now Pat. No. 6,556,638.

(60) Provisional application No. 60/121,078, filed on Feb. 22, 1999.

(51) Int. Cl.
*H04B 1/38* (2006.01)

(52) U.S. Cl. ...................... 375/222; 375/242; 375/245; 375/246

(58) Field of Classification Search ................ 375/222, 375/354, 254, 260, 242, 245; 702/189; 370/352, 370/503, 493
See application file for complete search history.

(56) References Cited

U.S. PATENT DOCUMENTS

| | | | |
|---|---|---|---|
| 5,528,625 A * | 6/1996 | Ayanoglu et al. | 375/222 |
| 5,790,594 A * | 8/1998 | Peng | 375/222 |
| 6,052,412 A | 4/2000 | Ruether et al. | |
| 6,151,364 A | 11/2000 | Ruether et al. | |
| 6,341,360 B1 * | 1/2002 | Abdelilah et al. | 714/704 |
| 6,516,025 B1 * | 2/2003 | Warke et al. | 375/222 |

* cited by examiner

*Primary Examiner*—Stephen Chin
*Assistant Examiner*—Ted M. Wang
(74) *Attorney, Agent, or Firm*—Sierra Patent Group, Ltd.

(57) ABSTRACT

Method and system for implementing digital filters in the data path of a Pulse Code Modulated (PCM) modem to allow efficient transition of a second analog to digital conversion process in a communication system including monitoring the upstream data path of the communication system to decode the V.34 portion of the data transmission which occurs during the handshake phase of the modem call, where the information contained in the upstream data channel during the handshake phase allows the communication system to determine the manner in which the PCM modem is training and transmitting data to the client modem.

40 Claims, 6 Drawing Sheets

METHOD AND APPARATUS FOR IMPLEMENTING DIGITAL FILTERS IN THE DATA PATH OF A PCM MODEM FOR EFFICIENT TRANSITION OF A SECOND ANALOG-TO-DIGITAL CONVERSION PROCESS

RELATED APPLICATIONS

This is a Continuation-In-Part application under 35 USC §120 of U.S. patent application Ser. No. 09/527,783 filed on Mar. 17, 2000 abandoned entitled "Method and Apparatus for Increased Data Speeds Using Synchronization and Digital Signal Processing Equalization Techniques" which is a continuation-in-part application of U.S. patent application Ser. No. 09/510,420 filed on Feb. 22, 2000 now U.S. Pat. No. 6,556,638, entitled "Method and Apparatus for Providing Increased Speed Using Synchronization and Bit Robbing Techniques", which claim priority under 35 USC §119 to provisional application 60/121,078 filed Feb. 22, 1999, each of the above-referenced applications assigned to GoDigital Networks Corporation, the assignee of the present application, and the disclosures of each of which are incorporated herein by reference in its entirety for all purposes.

BACKGROUND OF THE INVENTION

1. Field of the Invention

The present invention relates to high speed, high resolution signal transmission in data communication systems. In particular, the present invention is related to methods and system for providing high speed and high resolution data transmission for voice and/or data signals in V.90 modem telecommunication systems.

2. Description of the Related Art

Increasing demand for fast data connection from personal computers (PCs) for access from homes and businesses to data networks such as the world wide web through an Internet Service Provider (ISP) or a local area network (LAN) has given rise to the development in broadband networks employing Digital Subscriber Line (DSL) modems or cable modems. However, many existing locations in the United States and abroad currently do not have the necessary infrastructure to support such broadband networks. Thus, dial-up modem connection remains the best alternative to high speed access to data networks. Dial-up modem connections, however, have a significant limitation in the ability to transmit and/or receive data at a high transmission rate.

The introduction of V.90 standard 56K modems has increased the data transmission speed noticeably compared to the prior versions of modem technology such as V.34 modems. Prior to the introduction of the 56K modems, traditional modem standards assumed that both ends of a modem session have an analog connection to the public switched telephone network. Thus, data signals are converted from digital to analog and back again to the digital format such that the theoretical transmission rate was limited to approximately 33.6 Kbps. Moreover, transmission speeds above 33.6 kbps are not possible when the additional μ-law A/D conversion is introduced in the transmission path from the ISP server modem to the client modem required to accommodate the analog connection to the public switched telephone network. This limitation in speed is due to the quantization noise of the additional μ-law A/D conversion as well as the analog filters associated with the additional A/D converter and the corresponding μ-law D/A converter. It should be noted that the quantization noise of an A/D converter is a function of the resolution of the A/D conversion process. The resolution of the A/D conversion process is governed by the number of bits associated with each signal sample. The A/D converter used in typical telephony systems is an 8-bit companded converter, companding referring to the non-linear conversion characteristics of the A/D converter.

By contrast, the V.90 technology used in the 56 K modems approach data transmission from a different perspective. The V.90 technology assumes that one end of the modem session has a pure digital connection to the telephone network and takes advantage of this high speed digital connection. Indeed, by approaching the public switched telephone network as a digital network at the central office side, the V.90 technology can accelerate data transmission in the downstream path from the data network such as the internet to the remote side modem connected PCs. In this manner, the 56K modems differ from the prior modem technology such as the V.34 standard in that it digitally encodes downstream data instead of modulating it as analog modems as with V.34 modems.

More particularly, the presently available 56K modems achieve their high transmission speeds because the server modems provided by the ISP are digitally connected to the data network such as the public switched telephone network. As such, there is no A/D conversion in the path from the ISP server modem to the client modem at the remote end other than the A/D converter in the client modem itself. There is a D/A converter at the telephone company's Central Office (CO) equipment, but this D/A converter does not introduce quantization noise. Further detail on 56K modems and V.90 standard can be found in 3*Com V.90 Technology*, April, 1998 and in *A Digital Modem and Analogue Modem Pair For Use On the Public Switched Telephone Network (PSTN) at Data Signaling Rates of Up to 56,000 bit/s Downstream and up to 33,600 bit/s Upstream*, International Telecommunication Union, September, 1998.

Figure 1:
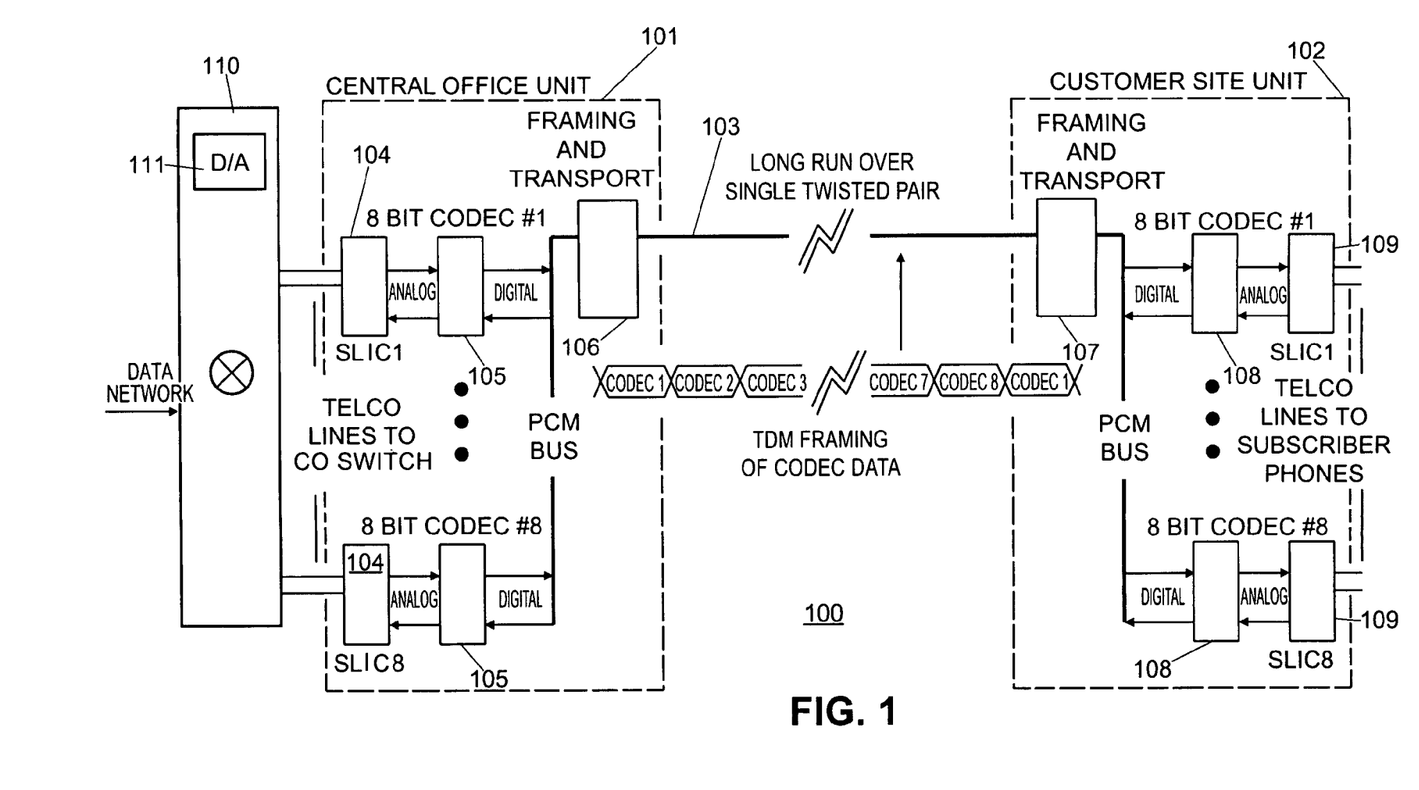
FIG. 1 illustrates an eight line subscriber carrier system.

FIG. 1 illustrates an eight line subscriber carrier system available from GoDigital Networks Corporation of Fremont, Calif., the assignee of the present invention. As shown, the subscriber carrier system 100 includes a Central Office Unit 101 that is coupled to a Customer Site Unit 102 by a bi-directional single twisted copper pair line 103. The Central Office Unit 101 is provided with eight Subscriber Line Interface Circuits (SLICs) 109, each of which is configured to emulate a telephone line termination. The Customer Site Unit 102 is provided with eight Subscriber Line Access Circuits (SLACs) 104, each of which are coupled to a subscriber line and further, configured to emulate the Central Office.

Moreover, the Central Office switch 110 located at the Central Office site receives an incoming digital transmitted at a rate of 56 Kbps from an ISP, for example. The Central Office switch 110, among other things, decodes the digital signal received from the ISP using a standard commercially available D/A converter 111 and transmits the decoded signal to the Central Office Unit 101 for each of the eight channels shown in FIG. 1.

As further shown in FIG. 1, each of the Central Office Unit 101 and the Customer Site Unit 102 are provided with a plurality of 8-bit μ-law 8 Ks/s codecs 105, 108 which are coupled to each of the SLICs 104 in the Central Office Unit 101, and to each of the SLACs 109 in the Customer Site Unit 102. Further shown in FIG. 1 are PCM buses which transmit and/or receive digital data bits from each of the 8-bit codecs 105, 108 in the Central Office Unit 101 and the Customer Site Unit 102, respectively, to the framing and transport mechanism 106, 107. The framing and transport mechanism 106, 107 of the Central Office Unit 101 and the Customer Site Unit 102, respectively are coupled to the single twisted copper pair 103.

The 8-bit codecs 104 in the Central Office Unit 101 are configured to encode analog data received from the Central Office switch (not shown) into a corresponding digital bit stream format and multiplex the same for transmission via the single twisted cable pair 103, while the 8-bit codecs 108 in the Customer Site Unit 102 are configured to demultiplex and decode the digital bit stream received from the Central Office Unit 101 into a corresponding analog form.

In particular, the µ-law codecs 105 receive 8,000 8-bit PCM code words per second, which translates to an aggregate bit rate of 64 Kbits/second, and converts the 8-bit PCM code words into corresponding analog voltage pulse signals each having 125 microsecond duration. The resulting output analog voltage pulse signals then has a stair-step characteristics. Moreover, the frequency spectrum of the analog voltage pulse signal is relatively broad compared to an analog voice band signal. For example, given a random sequence of PCM codewords, the frequency spectrum has a sinx/x shape, with a first spectral null at 8 KHz and repeated nulls at multiples of 8 KHz. It should be noted here that an analog voice band signal does not have appreciable energy above 4,000 Hz.

Furthermore, while not shown, there are provided low pass filters between each of the 8-bit codecs 105 and the SLICs 104 (SLACs 109 in the case of the Customer Site Unit 102) that pass energy up to approximately 3.4 KHz and attenuate the energy above 3.4 kHz such that energy above 4 KHz is severely attenuated. By way of example, the following Table 1 available from a datasheet for Lucent Technologies T7502 codec illustrates the attenuation characteristics for a given frequency:

TABLE 1

| Attenuation Characteristics | |
|---|---|
| Frequency (Hz) | Typical attenuation |
| <3,000 | 0 dB |
| 3,380 | −.50 dB |
| 3,860 | −10.7 dB |
| 4,000 | −12.0 dB |
| >4,600 | −28 dB |

As can be seen, the low pass filters are configured to contain the signal spectrum to a range of frequencies generally considered to be essential to human speech—approximately 300–3,400 Hz. Frequencies above 3,400 Hz are generally considered to have minimal impact on speech comprehension and furthermore, may cause crosstalk problems on subscriber lines.

It is to be noted that the mapping process of corresponding digital PCM codewords and analog voltages is non-uniform and confirms to µ-law encoding which was developed for processing speech signals where the step size between adjacent code words is proportional to the codeword magnitudes. This means that small magnitude code words are spaced very closely, and large magnitude codewords are spaced farther apart.

The µ-law encoding used in the United States —µ255 converter—requires the equivalent of a 13 bit linear DAC converter (i.e., 8,192 signal levels) to fully represent the 255 distinct levels (normally 256 levels for 8 bits, but there are two representations of "0") because of non-uniform spacing. The signal-to-noise ratio (SNR) of a µ255 converter is substantially constant at 38–39 dB level over an input range of 30 dB or more. This characteristics permits the use of an 8-bit converter to produce acceptable voice encoding over a dynamic range that otherwise would require a 13-bit linear ADC.

The speech signal presented to the encoder may vary in input level from −10 to −40 dBm, but the signal presented to the far listener has the same SNR over this entire range of inputs. However, the µ-law encoding rule is not optimized for data communication over the POTS network.

Moreover, distortion is introduced by the low pass filters, the SLICs 104 and the subscriber loop 103. These distortions include amplitude and phase distortion (so-called linear distortions), and non-linear distortions such as limiting and clipping. Other sources of signal degradation include Gaussian and impulse noise, and crosstalk. The linear distortions are generally the dominant sources of signal degradation. These linear distortion sources cause an effect generally known as Inter-Symbol Interference (ISI) in communications systems. As the term implies, ISI makes it difficult for a subscriber modem to reconstruct the analog signal levels associated with digital codewords from µ-law DAC because at the ADC sampling rate in the above example, the ADC sample is a weighted sum of the most recently transmitted pulse plus a number of previously transmitted values.

Furthermore, the low pass filters introduce additional ISI to the signal. The ISI is not compensated prior to resampling at the 8-bit codecs 105. Indeed, the ISI can be large enough compared to the desired term to cause a translation to a different coding level than the original DAC level of the Central Office switch line card. As a result, the sequence of codewords after resampling is in general not identical to the sequence of codewords at the input to the Central Office DAC in this type of system.

The unwanted ISI term can be compensated in the modem receiver using known digital signal processing (DSP) adaptive equalization techniques. For example, the output of the DSP equalizer in a modem receiver is a sequence of levels that are essentially free of ISI. These levels can be converted back to their corresponding PCM codewords, and the result is a substantially perfect reconstruction of the sequence of PCM codewords that were provided to the µ-law DAC at the Central Office, on the assumption that noise, crosstalk, and other impairments are negligible. In practice, equalization is not perfect, and impairments are present to some extent, and PCM modems are only able to resolve among enough levels to facilitate transmission at 40 to 56 kbps.

As discussed above, in the subscriber carrier system 100 shown in FIG. 1, an extra A/D conversion process is required in the downstream path towards the subscribers in the Central Office Unit 101 as compared to the case where no pairgain system is present. For example, in the downstream path, the extra A/D conversion is necessary in the Central Office Unit 101 before the data stream is provided to the twisted copper pair 103. When a subscriber (or user) is connected to the Customer Site Unit 102 via a 56 Kbps modem, the extra A/D conversion required in the system described above reduces the subscriber's downstream modem speed by approximately 30% over the speed that can otherwise be achieved by the modem without the additional A/D conversion process.

In the V.90 modem transmission system, codeword sequence distortion is not introduced since there is no second encoding operation, and only approximately 14 dB of attenuation is introduced to the signal at 4,000 Hz. Moreover, a V.90 modem receiver at the Customer Site Unit 102 in the transmission system can equalize the ISI and recover the codeword sequence. In practice, however, noise, crosstalk, and residual ISI which the equalization algorithms were not able to remove contribute to signal degradation. Indeed, only a subset of the possible 255 distinct μ-law codewords are typically used, and the actual data rates obtained by V.90 modems are generally less than 56 kbps which is the highest potential speed for V.90 modems.

Furthermore, as described above, the pair gain system not only introduces significant codeword sequence distortion in the resampling process in the Central Office Unit, but also, the system low pass filters the signal three times with low pass filters with approximately 14 dB rolloff at 4,000 Hz. These filters are in the Central Office linecard, the Central Office Unit SLICs, and the Customer Site Unit SLACs. Thus, the total rolloff at 4,000 Hz is 42 dB or more by the time the signal reaches the modem at the customer premises. Thus, a V.90 modem receiver would have to compensate for this rolloff in order to properly reconstruct the sequence of codewords that are provided to the D/A converter at the Central Office switch if this reconstruction were possible. Of course, the reconstruction of the codeword sequence from the Central Office switch is not possible since it was distorted in the Central Office Unit's A/D converter. As a result, the effective data transmission rate will be low, possibly no better than that can be achieved with a V.34 modem.

In a pairgain system, the additional A/D conversion introduced in the transmission path is under the control of the pair gain system supplier. Moreover, the A/D converter in the pair gain system does not need to be an 8-bit companded type as generally used in the typical telephony systems. In fact, the A/D converter in a pair gain system can have a greater number of bits associated with each sample than the typical 8 bits. These extra bits (with linear encoding) will decrease the quantization noise and increase the attainable modem data transmission rates. However, a greater number of bits may be required to be carried over the pairgain system resulting in a reduction in the number of subscribers. Moreover, a pairgain system provider may also use sample rates higher than the traditional 8K samples per second (s/s) common to most existing telephony equipment. Higher sample rate and higher resolution will allow the pairgain system unit located near the Central Office to sample the telephone line without introducing significant distortion into the signal coming out of the Central Office D/A converter.

The A/D converter in the ISP server modem has a higher resolution than the Central Office D/A converter. The combination of higher resolution A/D converter and adaptive equalization algorithms in the digital signal processor (DSP) allows the modem to estimate the sequence of Central office D/A levels accurately, allowing a signaling alphabet of up to 128 codes (7 bits per symbol), or data rates of up to 56 kbps. It should be also noted that the higher resolution gained by the A/D converter is maintained at the terminal end of the pair gain system by a D/A converter of the same resolution.

SUMMARY OF THE INVENTION

In view of the foregoing, a method of recovering PCM modem data in a data network in accordance with one embodiment of the present invention includes monitoring data transmission in an upstream data path of a data communication, retrieving downstream data path transmission information from said data transmission in said upstream data path, reconstructing PCM data in the downstream data path based on said retrieved downstream data path transmission information in the upstream data path, and transmitting the reconstructed PCM data.

The data transmission in said upstream data path direction is received from a client modem, the monitoring step may including the step of detecting a handshake protocol in said data communication.

The method may further include the step of initializing a state machine to a call start state, where said initializing step may include the step of detecting a V.90 modem call communication, and where said monitoring step may include the step of detecting a S/Sbar signal in said upstream data path.

The retrieving step may include the step of decoding said downstream data path transmission information.

The method in one aspect may further include the step of echo cancelling said data transmission in said upstream data path.

The step of reconstructing may include the step of performing data rate conversion, where said step of performing said data rate conversion may include converting a data rate from 8 Ksymbols/second to 3.2 Ksymbols/second.

The reconstructing step may include the step of retrieving one or more of quantization level parameters, where said retrieving step may include the step of comparing said one or more quantization level parameters to a corresponding one or more data samples, each of said data samples including an 8K data sample.

A method of recovering PCM modem data in a data network in accordance with another embodiment of the present invention includes monitoring data transmission in an upstream data path of a V.90 modem call communication, detecting a handshake protocol in said data transmission, retrieving downstream data path transmission information from said data transmission in said upstream data path, reconstructing PCM data in said downstream data path based on said retrieved downstream data path transmission information in said upstream data path, and transmitting the reconstructed PCM data.

A system for recovering PCM modem data in a data network in yet another embodiment of the present invention includes means for monitoring data transmission in an upstream data path of a data communication, means for retrieving downstream data path transmission information from the data transmission in said upstream data path, means for reconstructing PCM data in said downstream data path based on the retrieved downstream data path transmission information in said upstream data path, and means for transmitting the reconstructed PCM data.

The data transmission in said upstream data path direction may be received from a client modem.

The monitoring means may include means for detecting a handshake protocol in said data communication.

Furthermore, the system may also include means for initializing a state machine to a call start state, where said initializing means may include means for detecting a V.90 modem call communication, and the monitoring means may include means for detecting a S/Sbar signal in said upstream data path.

The retrieving means may include means for decoding said downstream data path transmission information, while the system in a further aspect may additionally include means for echo cancelling said data transmission in said upstream data path.

The reconstructing means in one embodiment may include means for performing data rate conversion, where said means for performing said data rate conversion may include means for converting a data rate from 8 Ksymbols/second to 3.2 Ksymbols/second.

The reconstructing means may include means for retrieving one or more of quantization level parameters, where said retrieving means may include means for comparing said one or more quantization level parameters to a corresponding one or more data samples, each of said data samples including an 8K data sample.

A system for recovering PCM modem data in a data network in accordance with still another embodiment of the present invention includes means for monitoring data transmission in an upstream data path of a V.90 modem call communication, means for detecting a handshake protocol in said data transmission, means for retrieving downstream data path transmission information from said data transmission in said upstream data path, means for reconstructing PCM data in said downstream data path based on said retrieved downstream data path transmission information in said upstream data path, means for transmitting the reconstructed PCM data.

In the manner described above, in one aspect of the present invention, during the start of a modem call, the retrain/renegotiate detection unit may be configured to detect the initiation and progress of a handshake protocol, and provides a signal to the state machine such that the state machine establishes a call start state. Thereafter, the state machine may be configured to instruct the V.34 demodulation unit to determine and decode the relevant information from the upstream data channel. The information that is decoded from the upstream data channel by the V.34 demodulation unit, in one aspect of the present invention, may correspond to the significant V.90 signal parameters of the downstream channel signal such as, for example, Digital Impairment Learning (DIL), TRN1d, TRN2d, and On-Line parameters which are necessary steps for a modem to establish a communication connection and are defined in the ITU V.90 modem standard. The V.90 reconstruction filter positioned in the path of the downstream signal may then be configured to use these parameters to accurately re-create the PCM data in the downstream direction.

During a modem call already in progress, the client modem and the PCM modem may decide to re-train their connection to a different connection speed or alternatively, use different parameters. In such a case, in one aspect of the present invention, the retrain/renegotiate detection unit may be configured detect the re-training as between the client modem and the PCM modem, and accordingly, may instruct the state machine to initiate the V.34 demodulation unit such that new decoded downstream signal parameters may be gathered and thereafter, provided to the V.90 reconstruction filter.

Accordingly, by monitoring the upstream communications channel, in accordance with the various embodiments of the present invention, it may be possible to decode the V.34 portion of the data transmission which occurs during the handshake phase of the modem call. The data contained in the upstream channel during the handshake phase of the call allows the communication system to determine how the digital modem (the PCM modem) is training and transmitting data to the client modem. With this information determined, the downstream filters may be more accurately configured to fully recover the original PCM modem data output stream.

These and other features and advantages of the present invention will be understood upon consideration of the following detailed description of the invention and the accompanying drawings.

INCORPORATION BY REFERENCE

What follows is a cite list of references each of which is, in addition to those references that may be cited above and below herein, including that which is described as background, and the above invention summary, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references may be cited in the written description and are also incorporated by reference into the detailed description of the preferred embodiment with the same effect as just described with respect to the following references:

U.S. patent application Ser. Nos. 09/527,783, 09/811,355, 09/811,356 and 09/810,331, each of which is assigned to the same assignee as the present application.

DETAILED DESCRIPTION OF THE PREFERRED EMBODIMENTS

Figure 2:
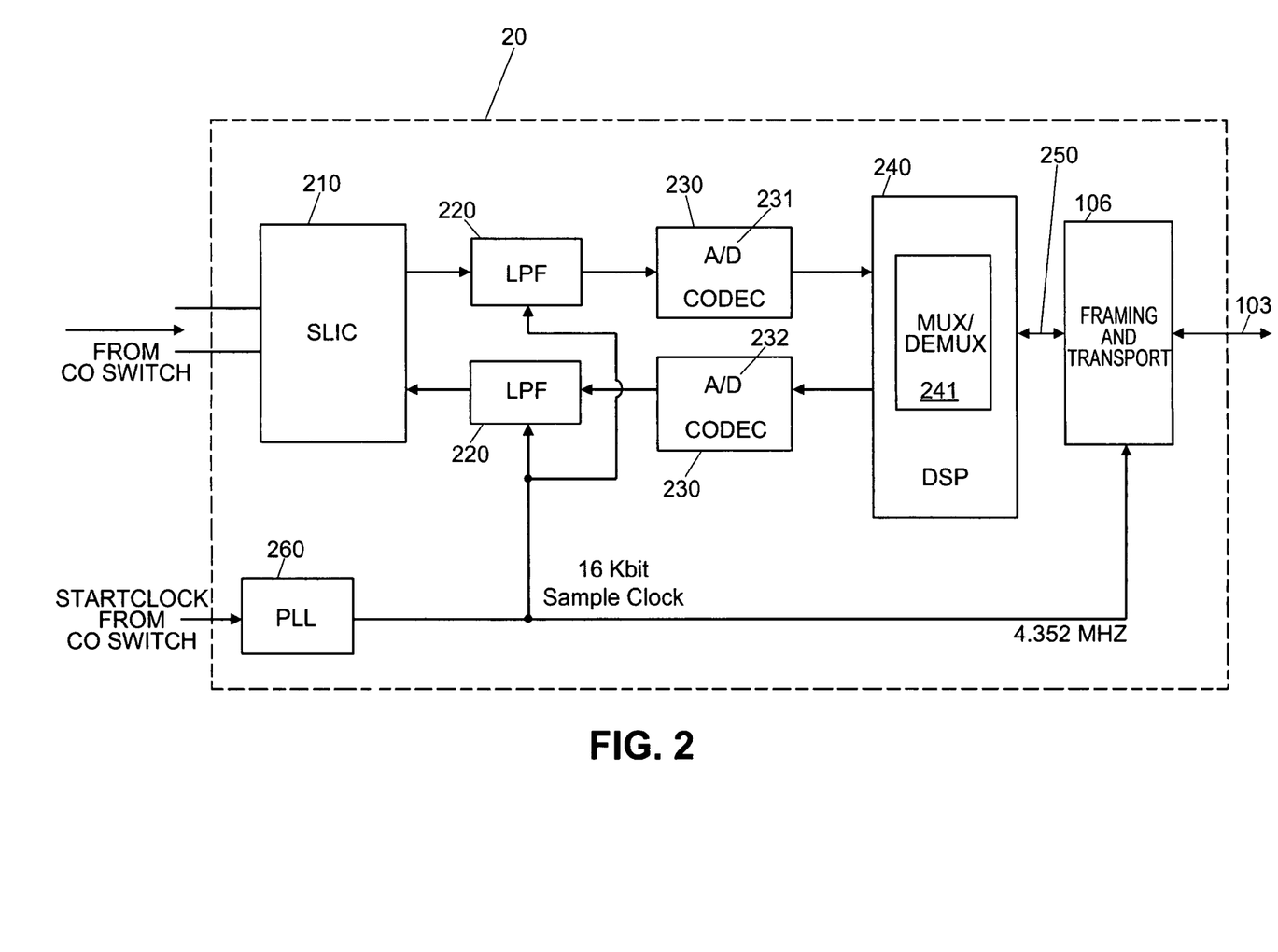
FIG. 2 illustrates a block diagram of the Central Office Unit of a pair gain system in accordance with one embodiment of the present invention.

FIG. 2 illustrates a block diagram of the Central Office Unit 20 of a pair gain system in accordance with one embodiment of the present invention. While FIG. 2 only illustrates the present invention with a single subscriber line, the pair gain system in accordance with the present system is intended to support multiple subscriber lines, for example, eight subscriber lines, each configured similarly to that shown in FIG. 2 and provided to the digital signal processor for processing and multiplexing/demultiplexing and transmission on the subscriber loop 103 via the Framing and Transport Unit 106 as will be explained in further detail below.

Referring to FIG. 2, as shown, there is provided a SLIC 210 which is configured to receive analog line input signals from the Central Office switch, and low pass filters 220 coupled to 16-bit 16 Ks/s linear codecs 230 each of which is further coupled to a digital signal processing unit (DSP) 240. The DSP 240 is configured to communicate with the Framing and Transport Unit 106 (similar to that shown in FIG. 1) via a PCM data bus 250, the Framing and Transport Unit 106 being configured to transmit and/or receive data from the customer site unit via bi-directional single twisted copper pair line 103.

The 16-bit linear codec 230 in the downstream path includes a 16-bit linear A/D converter 231 and a 16-bit linear D/A converter 232 in the upstream path. The 16-bit linear A/D converter 231 in the codec 230 is provided with sufficient sample rate and dynamic range to extract all voice band information from the subscriber loop in the frequency range from 0 to 4,000 Hz.

Also shown in FIG. 2 is a Phase Lock Loop (PLL) 260 which is configured to receive an 8 KHz network clock from the Central Office switch to generate sample clocks to synchronize the system, and in particular, the low pass filters 220 and the Framing and Transport Unit 106. In one embodiment, the PLL 260 is one similar to a commercially available PLL clock such as the MK1547-XX MicroClock available from ICS MicroClock of San Jose, Calif.

With the 8 KHz network clock, the PLL 260 generates a 4.352 MHz master clock MCLK and a 16 Kbit sample clock each of which are synchronized with the network clock from the Central Office switch. As shown, the 16 Kbit sample clock is provided to the low pass filters 220 while the 4.352 MHz master clock is provided to the Framing and Transport Unit 106. In this manner, in the downstream path of the signal transmission (i.e., from the Central Office switch, to the Central Office Unit down to the subscriber loop to the Customer Site Unit), the A/D converter 231 in the Central Office Unit 20 may be configured to sample the incoming analog signals from the D/A converter of the Central Office switch at synchronized points on the waveform (i.e., quantization step) and reduce the amount of additional quantization noise introduced.

Furthermore, in this manner, the analog signals from the D/A converter of the Central Office switch can be re-encoded to corresponding digital signals by the A/D converter 231 in the Central Office Unit 20 in the pair gain system with the same encoded synchronization level as the original signal leaving the ISP network. Moreover, since the encoded signal also depends upon the level of the incoming analog signals to be encoded, the incoming analog signal level is adjusted to the signal level leaving the Central Office switch.

Referring back to FIG. 2, the low pass filters 220 in the downstream path may be configured to filter signals in the frequency range from 0 to 4,000 Hz from the SLIC 210 without attenuation, and provide the filtered signals to the 16-bit codec 230. Conversely, the low pass filter 220 in the upstream path may be configured to filter signals received from the D/A converter 232 in the 16-bit codec filter 230 and provide the filtered signals to SLIC 210 for transmission to the Central Office switch.

In one aspect, the low pass filters 220 may be configured to not attenuate signals below 4 KHz since the DSP 240 is configured to extract information from the signals in the range of 0 to 4,000 Hz. Also, it should be noted that structurally, in one embodiment, the low pass filters 220 in the downstream and upstream path can be essentially the same, though the requirements for the A/D converter 231 may be more rigorous than those for the D/A converter 232 in the 16-bit codec 230 since a V.90 downstream signal generally performs better with less filtering in the 0–4,000 Hz range, while a V.34 upstream signal can tolerate more attenuation near 0 and 4,000 Hz.

In the downstream path, the DSP 240 may be configured to remove linear distortion from the signals received from the codec 230 and decimate the signals from 16 Ksamples/second back to 8 Ksamples/second. Moreover, the 8 Ksamples/second signals are µ-law encoded and the multiplexer/demultiplexer 241 in the DSP 240 multiplexes the signals with the other channels for transport to the Customer Site Unit via the single twisted cable pair 103 after the data stream is properly addressed with a framer in the Framing and Transport Unit 106. In the opposite upstream direction, the multiplexer/demultiplexer 241 in the DSP 240 may be configured to demultiplex the data stream received from the Customer Site Unit via the single twisted cable pair 103, convert the received data stream to the corresponding linear representation, and to upsample the same to 16 Ksamples/second for delivery to the respective D/A converter 232 in the codec 230.

Figure 3:
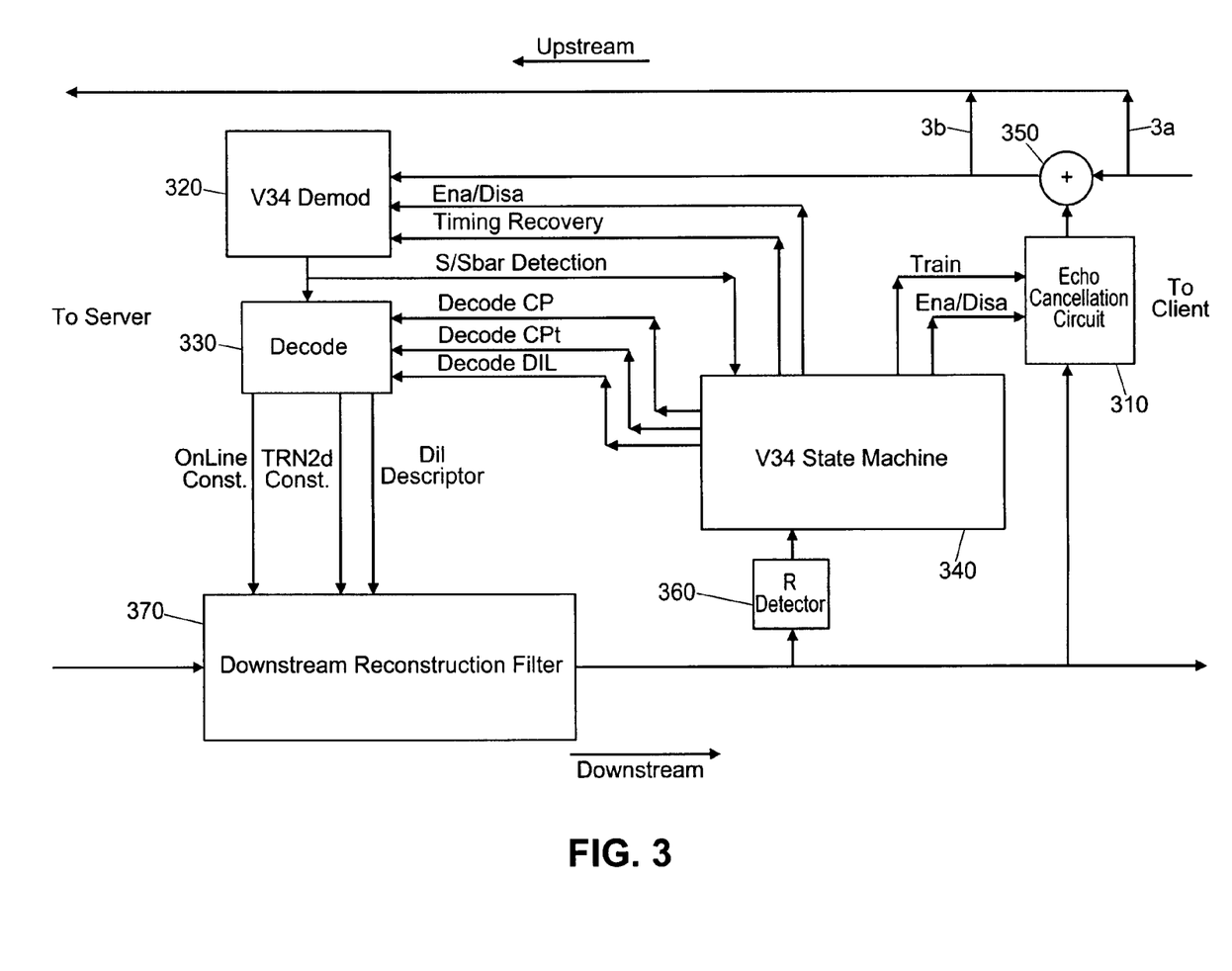
FIG. 3 illustrates a block diagram of the digital signal processing unit of the Central Office Unit in accordance with one embodiment of the present invention.

FIG. 3 illustrates a block diagram of the digital signal processing unit 240 of the Central Office Unit in accordance with one embodiment of the present invention. Referring to FIG. 3, the digital signal processing unit 240 in accordance with one embodiment of the present invention includes an echo cancellation unit 310, a V.34 demodulation unit 320, a decoder unit 330, a V.34 state machine 340, an adding unit 350, a retrain/renegotiate detection unit 360, and a reconstruction filter 370 in the downstream data path.

As shown in the Figure, the V.34 echo cancellation unit 310 which, in one embodiment may be implemented using adaptive FIR filter techniques, is provided in the upstream data path and may be configured to remove the downstream signal echo from the upstream signal such that the V.34 demodulation unit 320 may function more efficiently. In one aspect, the training and enable/disable functions of the echo cancellation unit 310 is controlled by the V.34 state machine 340 based upon the exact state of the modem call as discussed in further detail below. More specifically, the echo cancellation unit 310 in one aspect may be configured such that it is trained on each call using a TRN1d signal transmitted in the downstream path as part of the V.90 handshake sequence.

Referring back to FIG. 3, the demodulation unit 320 in one aspect of the present invention may be configured to perform rate conversion from, for example, 8 Ksymbols/second to 3.2 Ksymbols/second, the converted 3.2 Ksymbols/second rate being used for the upstream data path. Furthermore, the decoder unit 330 may be configured in one embodiment to decode the scrambled bit stream recovered by the demodulation unit 320 in accordance with the ITU V.90 specification, for example.

Referring again to FIG. 3, the state machine 340 in one embodiment may be configured to initialize upon the detection of a V.90 modem call. Once initialized, the state machine 340 may be configured to monitor the upstream data path for S/Sbar signals to determine the state of the modem call handshake process. In one aspect, during the handshake process, the state machine 340 may be configured to enable the Ja decode signal to recover the DIL descriptor, enable the Decode CPt signal indicative of the TRN2d constellation points, and enable CP signal indicative of the On-Line constellation points, the information corresponding to which, are then provided to the downstream reconstruction filter 370 to reduce the error in the V.90 downstream signal.

In other words, in one aspect of the present invention, the V.34 state machine 340 may be configured to function as a logical sequencer that, based on the detection of certain signals, for example, as discussed above, and their respective order of detection, may enable or disable processes in the upstream demodulation unit 320. Futhermore, in the case where the retrain/renegotiate detection unit 360 detects either a retrain or a rate renegotiate signals, and respectively transmits a detection signal to the state machine 340, the state machine 340 may be configured to reset the demodulation unit 320 to the respective appropriate states.

For example, the detection of a rate renegotiate signal by the retrain/renegotiate detection unit 360 and a subsequent detection signal to the state machine 340 may prompt the state machine 340 to re-enable the demodulation unit 320 and to prepare for the detection of a new CP signal sequence to collect a new set of On-Line constellation points. Additionally, upon the end of the connection process, the state machine 340 may be configured to place the demodulation unit 320 in a sleep state since the demodulation unit 320 does not need to be actively running during the online portion of the modem connection procedure. In this manner, the complexity of the demodulation unit 320 may be substantially reduced since it only needs to handle the four or sixteen point constellations that are used during the handshake process, rather than the much higher density constellations that are used during the online portion of the modem connection.

Referring yet again to FIG. 3, the adding unit 350 is provided to add the data received from the client modem in the upstream data path with the output from the echo cancellation unit 310, the resulting signal being provided to the demodulation unit 320. Additionally, the data paths 3a and 3b respectively, in the upstream data path of the communication system illustrate alternate paths from the client modem which may be either the raw output data stream received from the client modem side as shown by the data path 3a, or output of the adding unit 350 which takes into account the output of the echo cancellation unit 310 as well as the raw output data stream from the client modem side as illustrated by the data path 3b shown in the Figure.

Figure 4:
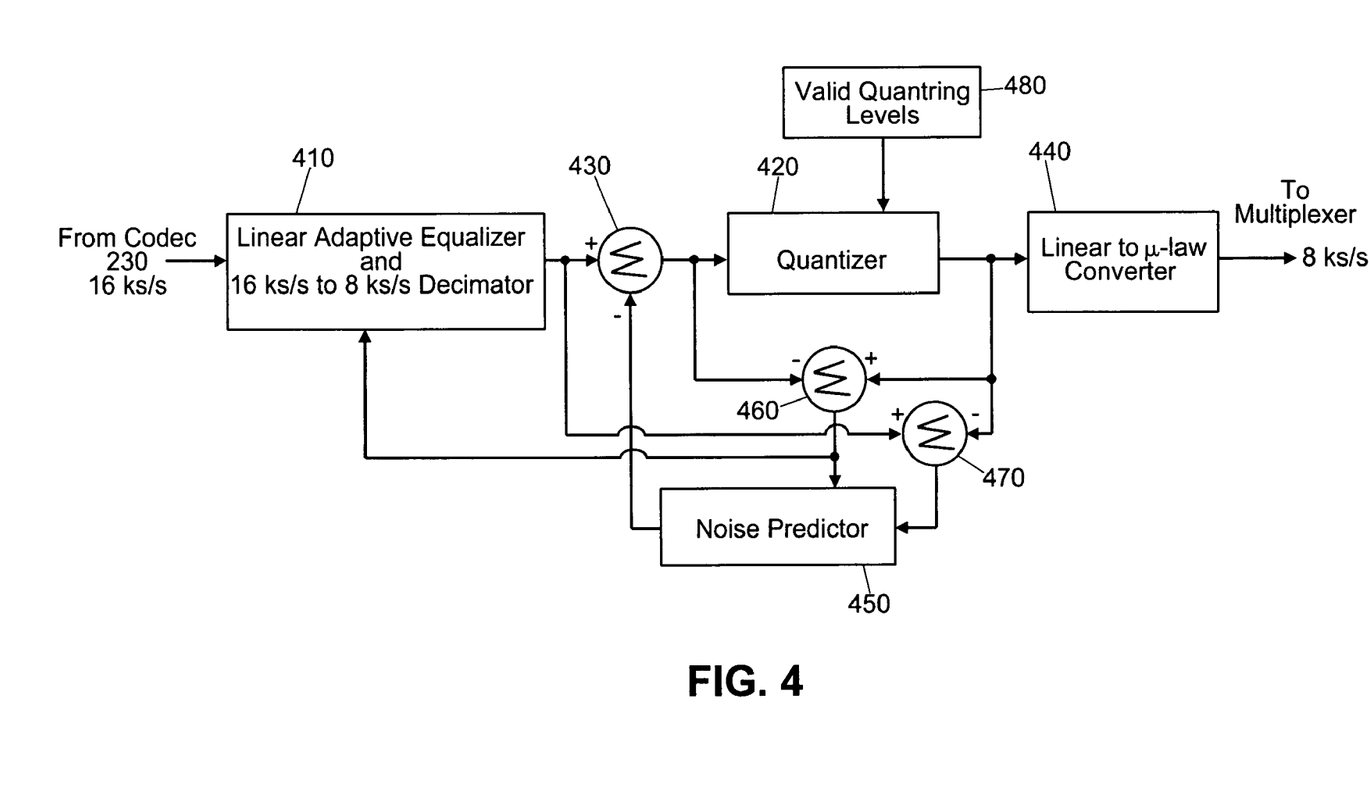
FIG. 4 illustrates a block diagram of the V.90 downstream reconstruction filter of the digital signal processing unit shown in FIG. 3 in accordance with one embodiment of the present invention.

FIG. 4 illustrates a block diagram of the V.90 downstream reconstruction filter 370 of the digital signal processing unit shown in FIG. 3 in accordance with one embodiment of the present invention. Referring to the Figure, in the downstream direction, the 16-bit 16 Ks/s data stream from the linear codec 230 (FIG. 2) is provided to a linear adaptive equalizer and decimator 410 which is configured to perform standard adaptive FIR filtering to equalize the input data stream for frequency and phase impairments, and to modify the sampling rate from 16 Ks/s to 8 Ks/s. The linear filter 410 operates over the frequency range of dc to 4 KHz. Both the input and output samples are represented in 16 bit linear format to achieve adequate signal to noise ratio (for example, more than 80 dB) and quantizing distortion levels. The linear equalizer and decimator 410 then provides the 16-bit 8 Ks/s data stream to a quantizer 420 via a summing unit 430 as explained in further detail below.

The quantizer 420 is configured to receive the parameters recovered from the upstream data channel which are then used during the DIL, TRN2d, and on-line portions of the modem call connection. In particular, the quantizer 420 may be configured to compare each 8K sample received from the equalizer 410 to a set of expected quantizing levels retrieved from a valid quantizing levels database 480 to pick the closest value. The determined value is then provided to the output of the quantizer 420 for transmission to the client modem. More specifically, in one embodiment of the present invention, the output of the quantizer 420 is provided to a linear to μ-law converter 440 for conversion from linear to companded μ-law code translation to thereby provide μ-law encoded 8 Ks/s data stream for transmission downstream on the DSL backbone via the single twisted copper pair 103 (FIG. 1) to the customer premise site after being multiplexed with data stream from the other channels in the subscriber carrier system.

Further shown in FIG. 4 is a noise predictor 450 which is an adaptive filter used to remove low frequency artifacts from the input signal that still remain after adaptive equalization by the linear adaptive equalizer 410. In particular, as can be seen from FIG. 4, the linear adaptive equalizer 410 is updated based on the error signal between the input and the output of the quantizer 420 determined and provided to the linear adaptive equalizer 410 by a summing unit 460. It should be noted that in FIG. 4, the input provided to the quantizer 420 is after the output of the noise predictor 450 has been subtracted from the output of the equalizer and decimator 410 by the summing circuit 430 such that the low frequency errors are removed from the recovered signal before it is provided to the equalizer 420.

Moreover, the input to the noise predictor 450 determined by a summing unit 470 is the difference between the output of the equalizer and decimator 410 and the output of the quantizer 420. In one aspect of the present invention, the noise predictor 450 may be configured to update its input signal based upon the quantization error signal received from the summing unit 460 which is determined by comparing the input of the quantizer 420 to its output. The updated signal from the noise predictor 450 is then provided to the summing unit 430 as described above to be subtracted from the output signal of the equalizer and decimator 410 to remove low frequency errors from the recovered signal. In addition, the quantization error from the summing unit 460 is also provided to the equalizer and decimator 410 to correct for linear frequency and phase deterioration to the 16 Ks/s data received from the codec 230 (FIG. 2).

In this manner, the noise predictor 450 in one embodiment may be configured to remove low frequency artifacts while the linear equalizer 410 may be configured to correct for linear frequency and phase impairments introduced by the D/A and A/D central office interface with minimal interaction between the two. Additionally, filter convergence may be minimized by preventing decision errors from feeding back to the filter adaptation signal.

As discussed above, the output of the equalizer 410 is decimated to the 8 KHz sample. This equalizer output signal is a series of numbers corresponding to the voltages associated with the original sequence of PCM codewords at the Central Office switch D/A converter. These values are converted to PCM codewords by the quantizer 420 and μ-law encoded by the linear to μ-law converter 440 such that these PCM codewords correspond to the sequence of PCM codewords received from the Central Office switch with minimal signal degradation. If the noise terms are sufficiently small relative to the spacing between PCM codewords, and the ISI terms are removed completely resulting in a complete reconstruction of the original sequence, which can then be transmitted downstream to the subscriber units via the subscriber loop.

The reconstructed codeword sequence is transmitted without loss over the digital pairgain subscriber loop to the customer site unit. The environment is generally better since the headend unit is usually only a short distance from the Central Office linecard. For example, currently, there is no pair gain system present in the Central Office to customer connection, and assuming the cable length is 10,000 feet, the modem signal would pass through 10,000 feet of cable and would be significantly attenuated. In addition, there could be significant noise terms introduced along this cable. In a pairgain system, the signal from the Central Office is in analog format for only about one hundred feet of cable until it is reconverted to digital form at the Central Office Unit. The signal is transported to the remote pair gain unit typically in the subscriber's neighborhood without loss. Then the signal is converted back to analog and delivered to the subscriber over a cable that is typically only a few hundred feet long. Thus the attenuation and added noise would be much less than in the case where no pair gain system is present.

Indeed, while noise and residual ISI terms are generally not completely negligible, the signal reconstruction described above is the same as that found in a V.90 customer premise modem and is at least as accurate as that normally found in customer premise modems. Accordingly, the technology used in V.90 modem receivers can be used in the pair gain system in accordance with the present invention to provide simple yet effective system design such that higher signal transmission rate can be achieved. In this manner, in accordance with the present invention, a multiple channel pair gain subscriber carrier system which supports V.90 transmission standard is disclosed. Accordingly, subscribers such as computer users that are connected to an ISP via a V.90 modem can receive data at a much higher rate than previously available.

Figure 5A:
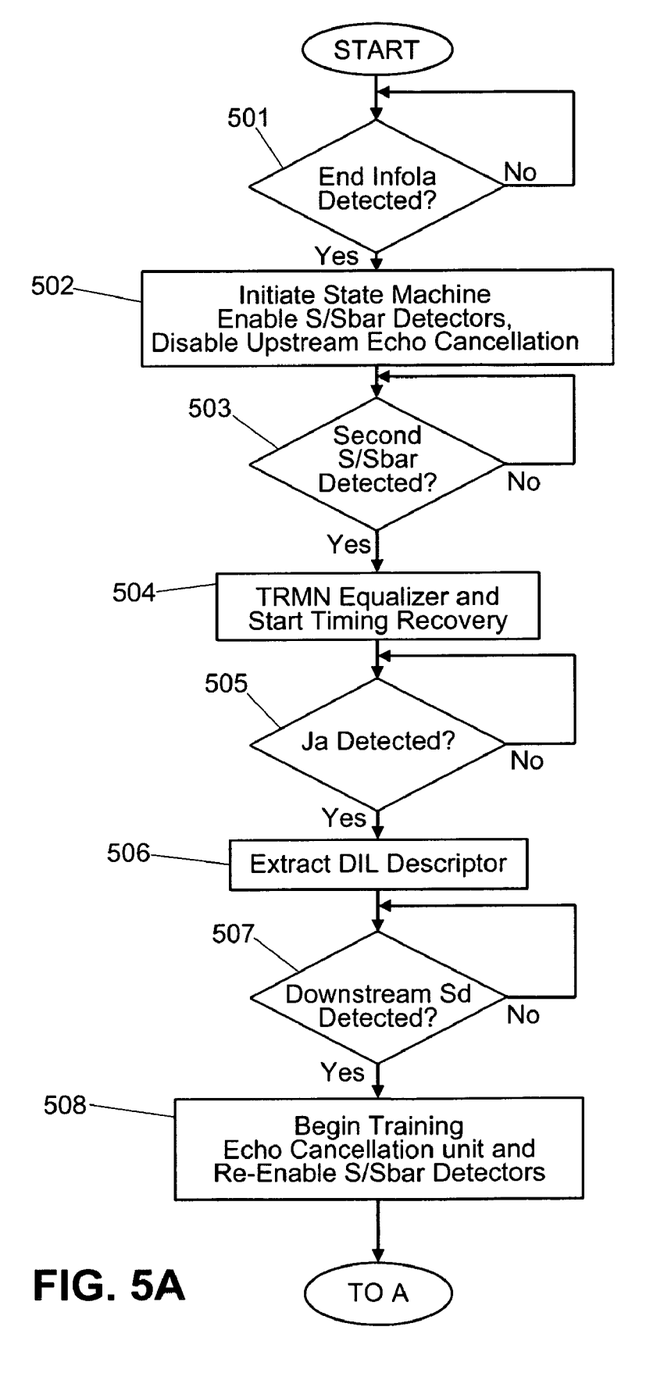
FIGS. 5A–5B illustrate a flow chart of the V.34 state machine process in accordance with one embodiment of the present invention.
Figure 5B:
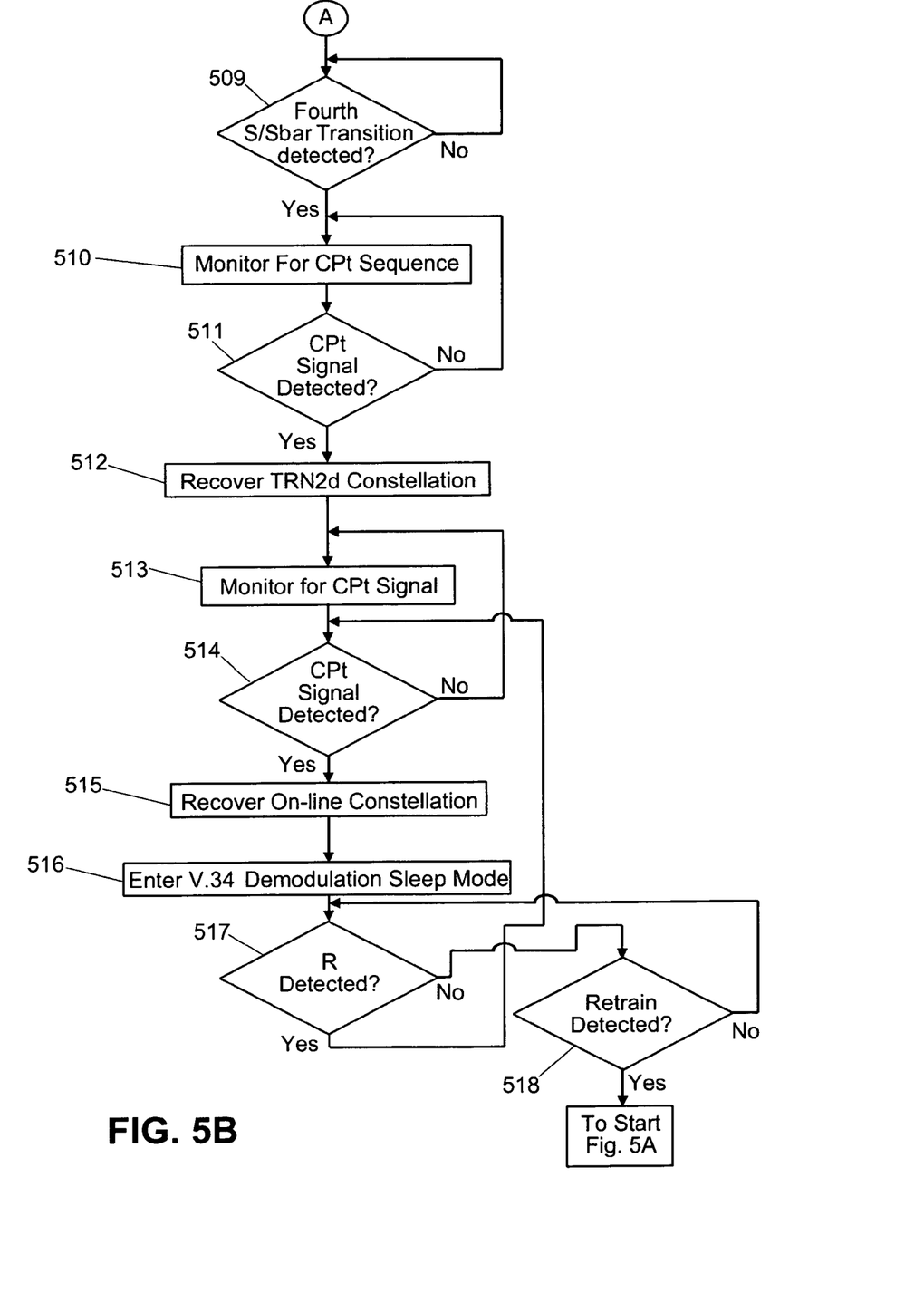

FIGS. 5A–5B illustrates a flow chart of the V.34 state machine 340 process in accordance with one embodiment of the present invention. Referring to FIG. 5A, at step 501, in the downstream data path, end Info1A signal is monitored and when detected, at step 502, the state machine 340 (FIG. 3) is initiated, the upstream echo cancellation unit 310 is set in the off state (disabled), and S/Sbar detectors are enabled. Thereafter at step 503, the second S/Sbar transition is monitored, and when detected, at step 504, using PP and TRN signals transmitted from the client modem in the upstream data path, the equalizer in the V.34 demodulation unit 320 is trained and timing recovery is initiated.

At step 505, it is determined whether the Ja signal is detected, and upon detection, at step 506, DIL descriptor is extracted for use in the downstream data path processings. At step 507, it is determined whether the downstream Sd signal is detected, and upon detection, at step 608, the echo cancellation unit 310 (FIG. 3) training is initiated and the S/Sbar detectors are re-enabled.

Referring now to FIG. 5B, at step 509, the fourth S/Sbar transition is monitored and when detected, at step 510, the CPt sequence monitoring is initiated. Thereafter, at step 511, when the CPt sequence is detected, at step 512, the TRN2d constellation is recovered, and at step 513, the CP signal monitoring is initiated. Upon detecting the CP signal at step 514, the on-line constellation is recovered at step 515, and thereafter, at step 516, the state machine may place the V.34 demodulation unit 320 in a sleep mode. Thereafter, at step 517, it is determined whether the renegotiate (R) signal is detected. If the renegotiate signal is detected at step 517, then the procedure returns to step 514 and monitors for the detection of the CPt signal. On the other hand, if at step 517 it is determined that the renegotiate signal is not detected, then at step 518, it is determined whether the retrain signal is detected. In the case where the retrain signal is detected at step 518, the procedure returns to step 501 and monitors for end Info1A signal. On the other hand, if the retrain signal at step 518 is not detected, then the procedure returns to step 517 where the renegotiate signal is monitored for detection.

Referring back to FIGS. 3 and 5A–5B, while not specifically shown in the state machine process flowchart of FIGS. 5A–5B, in one aspect of the present invention, the renegotiate/retrain detector 360 may be configured to detect a rate renegotiate signal in the downstream signal path at any point in the state machine process shown in FIGS. 5A–5B, in which case, the state machine 340 may be configured to be re-entered at CP (step 514 of FIG. 5B). Furthermore, the renegotiate/retrain detector 360 may additionally be configured to detect a re-train signal in the downstream data path, in which case, in one aspect of the present invention, the state machine 340 may be configured to be reset. Again, while the detection of the re-train signal by the renegotiate/retrain detector 360 is now shown in the state machine process flowchart of FIGS. 5A–5B, in one aspect of the present invention, the renegotiate/retrain detector 360 may be configured to detect the re-train signal at any point during the state machine process shown in FIGS. 5A–5B, the detection of which may reset and initiate the state machine 340.

In the manner described above, in accordance with various embodiments of the present invention, by monitoring the upstream data communications channel, it is possible to decode the V.34 portion of the data transmission which occurs during the handshake phase of the modem call. The data contained in the upstream channel during the handshake phase of the call allows the communication system to determine how the digital modem (the PCM modem) is training and transmitting data to the client modem. With this information determined, the downstream filters may be more accurately configured to fully recover the original PCM modem data output stream.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of recovering PCM modem data in a data network, comprising the steps of:
monitoring data transmission in an upstream data path of a data communication;
retrieving downstream data path transmission information from said data transmission in said upstream data path;
reconstructing PCM data in said downstream data path based on said retrieved downstream data path transmission information in said upstream data path wherein said reconstructing step includes the step of retrieving one or more of quantization level parameters; and
transmitting said reconstructed PCM data wherein said monitoring step includes the step of detecting a S/Sbar signal in said upstream data path.

2. The method of claim 1 wherein said data transmission in said upstream data path direction is received from a client modem.

3. The method of claim 1 wherein said monitoring step includes the step of detecting a handshake protocol in said data communication.

4. The method of claim 3 further including the step of initializing a state machine to a call start state.

5. The method of claim 4 wherein said initializing step includes the step of detecting a V.90 modem call communication.

6. The method of claim 1 wherein said retrieving step includes the step of decoding said downstream data path transmission information.

7. The method of claim 1 further including the step of echo cancelling said data transmission in said upstream data path.

8. The method of claim 1 wherein said step of reconstructing includes the step of performing data rate conversion.

9. The method of claim 8 wherein said step of performing said data rate conversion includes converting a data rate from 8 Ksymbols/second to 3.2 Ksymbols/second.

10. The method of claim 1 wherein said retrieving step includes the step of comparing said one or more quantization level parameters to a corresponding one or more data samples.

11. The method of claim 10 wherein each of said data samples include an 8 K data sample.

12. A method of recovering PCM modem data in a data network, comprising the steps of:
monitoring data transmission in an upstream data path of a V.90 modem call communication;
detecting a handshake protocol in said data transmission;
retrieving downstream data path transmission information from said data transmission in said upstream data path;
reconstructing PCM data in said downstream data path based on said retrieved downstream data path transmission information in said upstream data path wherein said reconstructing step includes the step of retrieving one or more of quantization level parameters; and
transmitting said reconstructed PCM data wherein said monitoring step includes the step of detecting a S/Sbar signal in said upstream data path.

13. The method of claim 12 wherein said data transmission in said upstream data path direction is received from a client modem.

14. The method of claim 12 further including the step of initializing a state machine to a call start state.

15. The method of claim 12 wherein retrieving step includes the step of decoding said downstream data path transmission information.

16. The method of claim 12 further including the step of echo cancelling said data transmission in said upstream data path.

17. The method of claim 12 wherein said step of reconstructing includes the step of performing data rate conversion.

18. The method of claim 17 wherein said step of performing said data rate conversion includes converting a data rate from 8 Ksymbols/second to 3.2 Ksymbols/second.

19. The method of claim 18 wherein said retrieving step includes the step of comparing said one or more quantization level parameters to a corresponding one or more data samples.

20. The method of claim 19 wherein each of said data samples include an 8 K data sample.

21. A system for recovering PCM modem data in a data network, comprising:
means for monitoring data transmission in an upstream data path of a data communication;
means for retrieving downstream data path transmission information from said data transmission in said upstream data path;
means for reconstructing PCM data in said downstream data path based on said retrieved downstream data path transmission information in said upstream data path wherein said reconstructing means includes means for retrieving one or more of quantization level parameters; and
means for transmitting said reconstructed PCM data wherein said monitoring means includes means for detecting a S/Sbar signal in said upstream data path.

22. The system of claim 21 wherein said data transmission in said upstream data path direction is received from a client modem.

23. The system of claim 21 wherein said monitoring means includes means for a handshake protocol in said data communication.

24. The system of claim 23 further including means for initializing a state machine to a call start state.

25. The system of claim 24 wherein said initializing means includes means for detecting a V.90 modem call communication.

26. The system of claim 21 wherein said retrieving means includes means for decoding said downstream data path transmission information.

27. The system of claim 21 further including means for echo cancelling said data transmission in said upstream data path.

28. The system of claim 21 wherein said reconstructing means includes means for performing data rate conversion.

29. The system of claim 28 wherein said means for performing said data rate conversion includes means for converting a data rate from 8 Ksymbols/second to 3.2 Ksymbols/second.

30. The system of claim 21 wherein said retrieving means includes means for comparing said one or more quantization level parameters to a corresponding one or more data samples.

31. The system of claim 30 wherein each of said data samples include an 8 K data sample.

32. A system for recovering PCM modem data in a data network, comprising:
means for monitoring data transmission in an upstream data path of a V.90 modem call communication;
means for detecting a handshake protocol in said data transmission;
means for retrieving downstream data path transmission information from said data transmission in said upstream data path;
means for reconstructing PCM data in said downstream data path based on said retrieved downstream data path transmission information in said upstream data path wherein said reconstructing means includes means for retrieving one or more of quantization level parameters; and
means for transmitting said reconstructed PCM data wherein said monitoring means includes means for detecting a S/Sbar signal in said upstream data path.

33. The system of claim 32 wherein said data transmission in said upstream data path direction is received from a client modem.

34. The system of claim 32 further including means for initializing a state machine to a call start state.

35. The system of claim 32 wherein said retrieving means includes means for decoding said downstream data path transmission information.

36. The system of claim 32 further including means for echo cancelling said data transmission in said upstream data path.

37. The system of claim 32 wherein said reconstructing means includes means for performing data rate conversion.

38. The system of claim 37 wherein said means for performing said data rate conversion includes means for converting a data rate from 8 Ksymbols/second to 3.2 Ksymbols/second.

39. The system of claim 32 wherein said retrieving means includes means for comparing said one or more quantization level parameters to a corresponding one or more data samples.

40. The system of claim 39 wherein each of said data samples include an 8 K data sample.

* * * * *